(No Model.)
T. ISAAC.
CALIPERS OR DIVIDERS.
No. 426,502.  Patented Apr. 29, 1890.
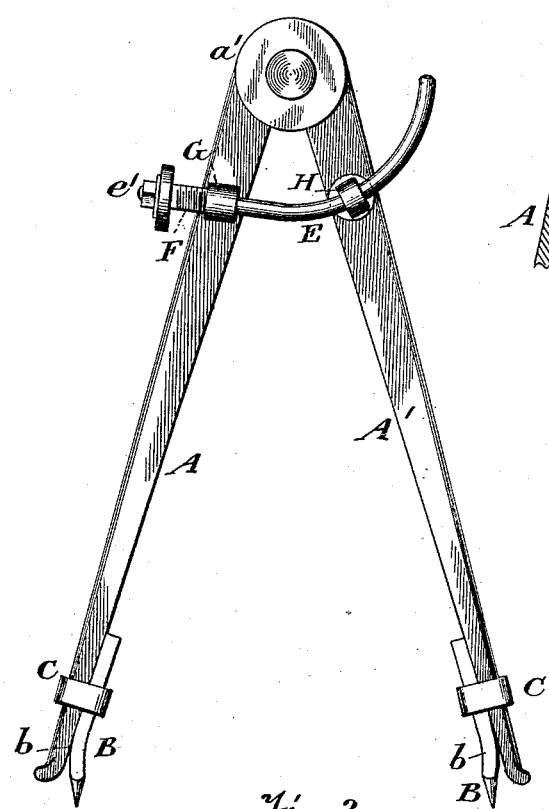
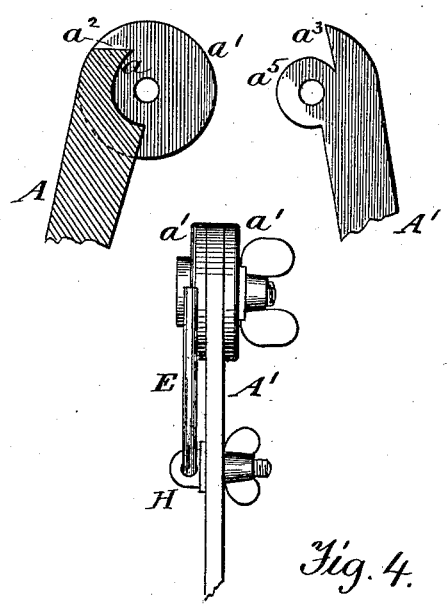
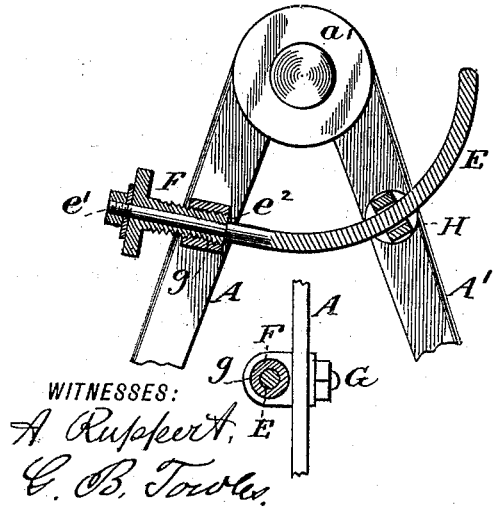
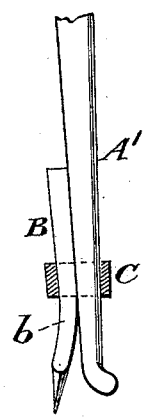
WITNESSES:
A. Ruppert
C. B. Towles
INVENTOR
Thomas Isaac
BY Thomas P. Simpson
ATTORNEY.

UNITED STATES PATENT OFFICE.

THOMAS ISAAC, OF SACRAMENTO, CALIFORNIA.

CALIPERS OR DIVIDERS.

SPECIFICATION forming part of Letters Patent No. 426,502, dated April 29, 1890.

Application filed January 3, 1890. Serial No. 335,802. (No model.)

*To all whom it may concern:*

Be it known that I, THOMAS ISAAC, a citizen of the United States, residing at Sacramento, in the county of Sacramento and State of California, have invented certain new and useful Improvements in Calipers and Dividers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of my invention is to improve calipers or dividers, as hereinafter described, and pointed out in the claim.

Figure 1 of the drawings is a side elevation; Fig. 2, a view of the joint-pieces in detail; Fig. 3, a view of the means for spacing the legs; Fig. 4, a view in detail of the means by which I confine the points at any suitable adjustment.

In the drawings, A A' represent the caliper-legs, made to taper from the joint to the ends, where the pointers B are attached. I curve the points B at $b$, so that they will readily stick in the table or board when stretched to the greatest distance apart. C are the clamps which hold them to the legs A A', the same being made of metal and in the shape of a flattened loop, which will slide down on the leg to receive the shank of the point and upwardly thereon until tightly held by friction to the leg. The caliper-leg A has at its large end a circular cavity $a$ and two parallel disks $a'\ a'$—one on each side of the cavity—and also has a flat surface $a^2$ on top, while the leg A' has a lip $a^3$, which bears on the surface $a^2$ to limit the arc on which the legs shall move, and also an integral ring $a^5$, whose hole registers with those of the two disks between which it fits, so that the headed pivot-screw may have its shank pass through all three and receive a nut on the end. This joint will allow the legs to be spaced or adjusted from the smallest angle up to a right angle. The practical advantage of this joint is that it will not work loose and is so strong as to be very durable.

E represents a curved rod having an end thread $e'$, which receives a washer and nut, which presses upon the head of the bolt F. The latter has a central hole through head and shank and is threaded on the outside, while the rod E passes through the bolt and supports its lower end on a shoulder $e^2$.

G H are two eyebolts, which are swiveled to the legs and clamped thereto by a nut and washer when the rod has been adjusted by means of the hollow screw F working in the thread on the inside of the eye $g$.

Having thus described all that is necessary to a full understanding of my invention, what I claim as new, and desire to protect by Letters Patent, is—

The curved rod E, having the end thread $e'$ to receive a clamp-nut, the hollow screw F, and the swiveled eyebolts G H, end-threaded to receive a clamp-nut, the eyebolt G being threaded on the inside to receive the screw F, in combination with the caliper-legs, as and for the purpose specified.

In testimony whereof I affix my signature in presence of two witnesses.

THOMAS ISAAC.

Witnesses:
RICHARD VAUGHAN,
MICHAEL FISHER.